United States Patent [19]
Jung

[11] Patent Number: 4,818,510
[45] Date of Patent: Apr. 4, 1989

[54] MODIFIED CLOSE FRACTION BATCH PROCESS FOR PURIFICATION OF SIO₂

[75] Inventor: Lothar Jung, Bridgewater, N.J.

[73] Assignee: Quartz Technology, Inc., Bridgewater, N.J.

[21] Appl. No.: 789,646

[22] Filed: Oct. 21, 1985

[51] Int. Cl.⁴ .............................................. C07B 33/12
[52] U.S. Cl. ..................... 423/335; 423/340
[58] Field of Search ................................ 423/335, 340

[56] References Cited

U.S. PATENT DOCUMENTS

| | | | |
|---|---|---|---|
| 3,837,826 | 9/1974 | Sawyer | 65/62 |
| 3,961,030 | 6/1976 | Wiewiorowski et al. | 423/126 |
| 4,067,953 | 1/1978 | Roux et al. | 423/80 |
| 4,225,422 | 9/1980 | Trevoy et al. | 209/2 |
| 4,542,003 | 9/1985 | Watkins et al. | 423/340 |

FOREIGN PATENT DOCUMENTS

| | | | |
|---|---|---|---|
| 4523605 | 12/1966 | Japan | 423/240 |
| 49-25417 | 6/1974 | Japan | 423/240 |
| 2111035 | 6/1983 | United Kingdom | 423/240 |

Primary Examiner—Robert L. Stoll
Assistant Examiner—Lori S. Freeman
Attorney, Agent, or Firm—Lorusso & Loud

[57] ABSTRACT

The disclosed process separates impurities, including admixed minerals other than quartz and quartz particles having relatively high levels of lattice impurities, from a quartz containing particulate material to recover a high purity quartz product. The process involves treatment with a solvent to reduce the size of the impurities relative to the quartz product and the thus treated material is then classified by size to recover the purified product. If impurities less soluble than the quartz product are also present, a second solvent treatment is conducted to reduce the size of the quartz particles relative to the less soluble impurity and a second classification by size is conducted. In a preferred embodiment, the quartz is subjected to a heat/quench cycle to fracture quartz particles thereby exposing occluded and interstitial impurities to the solvent leach. The intermediate product exiting the final solvent treatment and classification steps is dried, blended and roasted in a vacuum to remove gases.

27 Claims, 1 Drawing Sheet

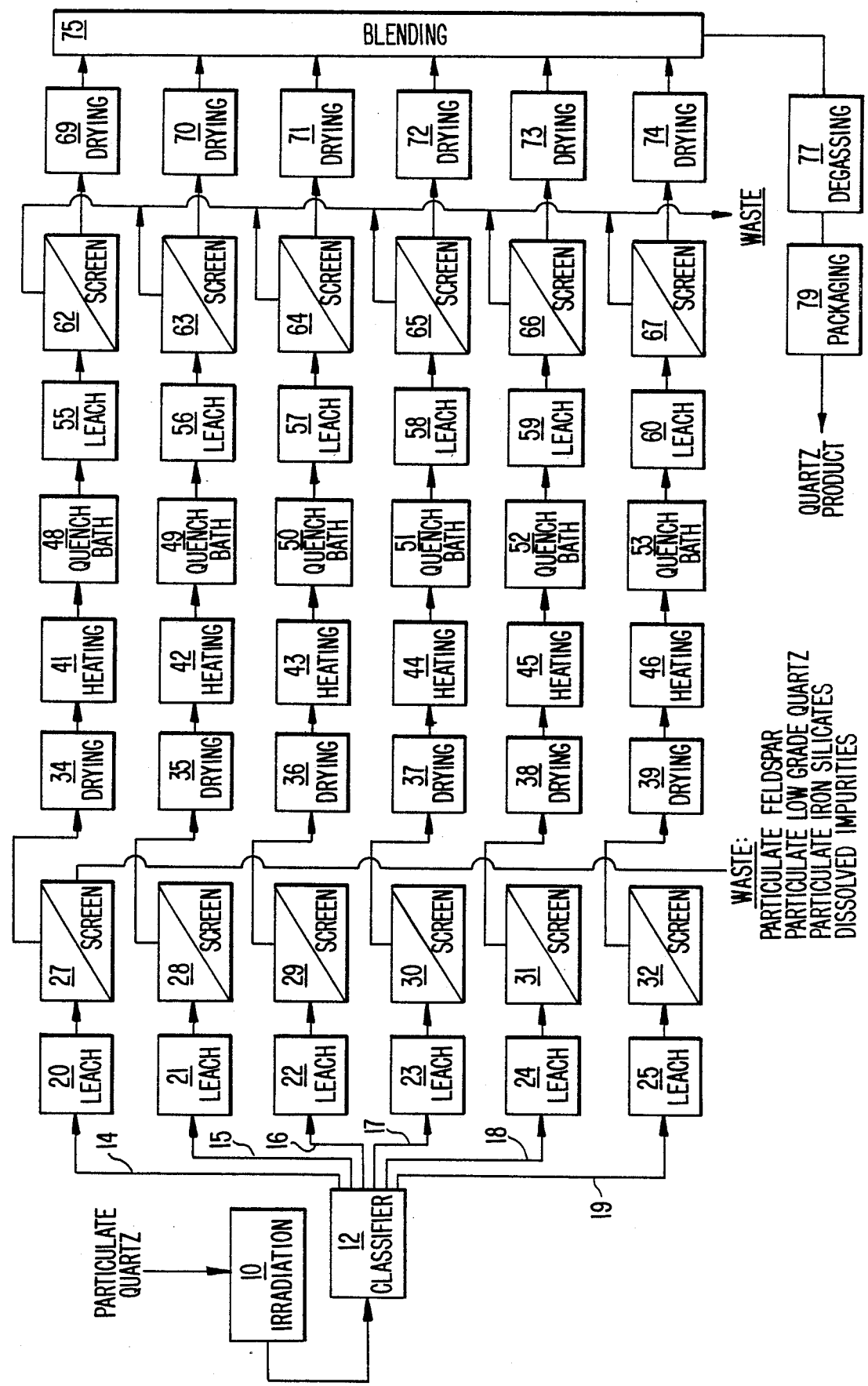

MODIFIED CLOSE FRACTION BATCH PROCESS FOR PURIFICATION OF $SiO_2$

FIELD OF THE INVENTION

This invention relates to the batch purification of particulate $SiO_2$.

BACKGROUND OF THE INVENTION

The impurities in particulate $SiO_2$, whether it be natural or manmade crystalline (quartz) or amorphous (fused quartz or fused silica), can be classified as follows:

External Impurities
Adhering Surface Impurities
Adhering Process Conditioned Surface Impurities
Mixed in Impurities Internal Impurities
Occluded/Interstitial Impurities
 (a) solids
 (b) liquids
 (c) gases
Lattice Impurities High purity particulate $SiO_2$, containing low or undetectable levels of the above-identified types of impurities, is required in substantial quantities for the manufacture of synthetic or cultured quartz crystals, for fused quartz products, optical glass melting, investment casting applications and as a filler in a variety of products.

Particulate $SiO_2$ can be produced from Silicon containing gases such as silicon tetrachloride, $SiCl_4$, using flame hydrolysis or flame oxidation of such gases. In these processes, droplets of $SiO_2$ of approximately five (5) microns are formed in the atmosphere and then conglomerated and depositied on surfaces in order to create larger bodies. The so formed material is largely porous as compared to crystalline particles and large amounts of its natal gas environment becomes occluded in it. More commonly, naturally occurring crystalline $SiO_2$ or quartz is used. Two distinct types of naturally colorless quartz have found widely accepted use, namely (1) faced or unfaced quartz crystals and (2) quartz with a relatively small degree of crystallization extracted from pegmatites or quartzites. While naturally or artificially irradiated "smokey" quartz has been used, quartz colored by lattice impurities, e.g., amethyst, citrine, rose, blue, has heretofore been considered useless for fused quartz applications.

Faced or unfaced crystals of larger crystallization are exclusively manually parted and divided into different groups based solely on their degree of transparency. They are consumed in various applications as lumps, also called "lascas", meaning chips in the Portuguese language owing to its historic supply from Brazil, ranging from approximately one quarter inch to one inch in size.

Pegmatite quartz is obtained as a powder only, due to its finer grained consistency and owing to the fact that it is commonly admixed with other minerals. It is separated from associated minerals (which then are considered impurities) using flotation, heavy liquid or other specific gravity type separations, followed by high intensity magnetic and electrostatic separations. These processes generally contribute heavily to the formation of so-called "process-conditioned" surface impurities, in contrast to naturally created surface impurities, such as those contributed by overburdens or "cappings".

Faced or unfaced crystals commonly exhibit significant variations of their internal and external impurities from one mining region to another even within the same crystal. In contradistinction, pegmatite quartz characteristically shows great uniformity of impurities for cerain identifiable types of quartz throughout a deposit or even a very large region.

Hans Ulrich Bambauer (Zurich), 1961, Habilitationsschrift der Abteilung fuer Naturwissenschaft der Eidgen. Technischen Hochschule. "Spurenelementgehalte und $\gamma$-Farbzentren in Quarzen aus den Zerrklueften der Schweizer Alpen", reported that the lattice impurities of naturally colorless quartz are made up from substitutional aluminum, replacing silicon atoms and compensationg cations such as lithium, sodium or hydrogen as hydroxyl (OH) whereby their presence can be described:

$$Al = \Sigma Li, H, Na \text{ (atomic)}$$

Bambauer and others have shown that other types of lattice impurities result in the naturally colored varieties of quartz as identified above. Bambauer has also shown that irradiation induced optical density increases using x- or $\gamma$- rays, correlate with the lithium content and therefore the aluminum concentration in the lattice.

State of the art beneficiation techniques, employed for both types of quartz, make no attempt to remove lattice impurities and no attempt to segregate fractions having high levels of lattice impurities. Experimental attempts to identify materials having low and high levels of lattice impurities, as a guide to elimination by sorting, have been unsuccessful.

U.S. Pat. No. 3,837,826, which issued to Sawyer in 1974 and is entitled "Color Sorting of Irradiated Quartz Crystals" discloses the manual sorting of batches of large size particulate quartz by selection, into radiation induced color categories. While the method works within a range of color, discernible by the human eye and capable electro-optical detectors, it does not work on quartz which fails to develop color due to the specific location of its impurities in the lattice and for quartz that exhibits early color saturation. More importantly, the color centers are limited to lattice impurities while interstitial or occluded impurities are not affected. Most importantly here, the method is totaly inapplicable to finely divided powders.

For the destruction (reduction) of the external impurities, hydrofluoric acid (HF), alone or mixed with another mineral acid, is the preferred reagent in the state of the art chemical beneficiation technologies. In order to provide the most uniform acid treatment for different size quartz particles, the state of the art technology realizes that it is most appropriate to use a closely sized batch.

In one currently used commercial process, mine run quartz is crushed and then divided into a continuous band of closely sized fractions and HF is used to individually treat each of such fractions, with their recombination into preferred distributions following the completion of such treatment, and is recognized in the art as the close fraction batch process (CFB process). The success of such an acid treatment is based solely on the ability of the HF or HF- mixtures to reduce the surface impurities and mixed impurities relative to the quartz with comparatively small dissolution losses of the quartz itself. By dividing the crushed quartz into fractions by size, any difference in surface area is largely negated as a factor affecting the relative rates of dissolution. Thus, the CFB process relies upon different rates of dissolution as between quartz and the various impurities attributable to differences in their chemical and physical properties (other than size). The objective of the CFB process is to completely destroy the impurities by dissolution with minimum loss of quartz. Most feldspars and many iron silicates, for example, exceed the dissolution rate of quartz in HF under identical conditions.

However, since the dissolution rate of an impurity is never infinitely greater than that of quartz, in the CFB process impurities can be reduced but never completely eliminated without also completely dissolving the quartz. One commercial CFB process takes about 4 hours overall and requires a volume of water approximately $7\times$ that of the quartz. Further, reduction of impurities to specification for certain end use applications inevitably leads to large losses of quartz. Finally, the present inventor has discovered that the CFB process actually increases the concentration of certain impurities, specifically those which have a lower rate of dissolution than quartz. This impurity increase, of course, is attributable to the inevitable loss of quartz during the leaching. Minerals having a slower rate of dissolution than quartz in HF include garnet, zircon, titanite, staurolite, albite and beryl.

SUMMARY OF THE INVENTION

Accordingly, it is an object of the present invention to eliminate rather than reduce impurities typically found in admixture with field run quartz.

Another object is the elimination of impurities with less consumption of water than the prior art techniques.

It is a further object of the present invention to eliminate minerals such as garnet, zircon, titanate, staurolite, albite and beryl, which are less soluble than quartz in a solvent such as HF, as well as minerals more soluble than quartz such as iron silicates and most feldspars.

Yet another object is to separate out that fraction of the quartz particles containing more lattice impurities than the batch average.

Another object is to provide techniques for more efficient removal of gases, solids and liquids existing in the quartz as occlusions or interstitial impurities.

It is yet another object of the present invention to accomplish the foregoing objectives with minimum loss of quartz.

To achieve the foregoing objectives the present invention adopts a radically different approach than that of the prior art. Instead of utilizing a leach to destroy impurities the present invention utilizes a leach to create a size differential as between relatively impure particulate material and the desirable higher purity or high grade quartz product, enabling separation by screening, air classification or other size classification techniques. Further, the present invention, by establishing a size differential between (1) quartz and more or less soluble admixed minerals and even (2) between quartz having high levels of lattice impurities and the desirable higher purity or high grade quartz, succeeds where the prior art fails, i.e. in elimination of both the less soluble admixed impurities and the quartz fractions with high lattice impurity levels.

Further, in the present invention, choice of an additive providing soluble fluoride salts in an HF leach leads to a drastically lower consumption of water as compared with the prior art.

Accordingly, the present invention provides a method of separating impurities and lower grade silicon dioxide from a silicon dioxide containing batch of particulate raw material to produce a higher purity or high grade silicon oxide product. Field run quartz, for example, is crushed, optionally subjected to a preliminary separation, e.g. flotation, and classified to obtain a plurality of sized fractions. Each of the sized fractions is then individually treated, in turn, with a solvent for silicon dioxide to reduce the size of the lower grade quartz relative to the desired higher purity fraction by dissolution. The treated material may then be classified by size to separate the desired high grade silicon dioxide fraction. In similar fashion, quartz may be separated from admixed and surface-adhering minerals less soluble than the quartz and the more soluble admixed and adhering minerals may be separated from the quartz more efficiently than heretofore possible.

In a preferred embodiment the process of the present invention utilizes two solvent leaches, the first tailored to reduce in size physically admixed minerals, to dissolve adhering surface impurities and to reduce the size of those quartz particles containing amounts of lattice impurities significantly greater than the batch (fraction) medium. The second leach is intended to dissolve significantly more quartz than the first leach and may optionally be adapted to attack, as well, occluded and interstitial impurities in the quartz.

Other preferred embodiments of the present invention include irradiation to speed the leach step and to further differentiate in size the desired product from lower grades of quartz, a heat and quench cycle to expose occluded impurities to dissolution and heating in a furnace, preferably under vacuum, to degas the quartz product.

"Higher purity quartz" or "higher purity silicon dioxide" as used herein has reference to a material of higher purity than the batch average for the starting material upon which the process of the invention operates.

BRIEF DESCRIPTION OF THE DRAWINGS

The sol drawing FIGURE is a schematic diagram of a preferred embodiment of the present invention.

DESCRIPTION OF THE PREFERRED EMBODIMENTS

The starting material may be any particulate artificial or synthetic silicon dioxide. If the starting material is a naturally occurring (field run) quartz, after crushing, it may be advantageous to perform preliminary separation of the quartz from other minerals such as feldspars by flotation. In general pegmatic material containing only 10-25% quartz requires such a preliminary separation. With a field run material containing higher percentages of quartz the preliminary separation may be omitted.

In the preferred embodiment illustrated in the sole drawing, optionally, the first leach may be preceded by irradiation, preferably ionizing irradiation, with cobalt 60 being the most economical source of such irradiation. In the preferred embodiment irradiation is conducted prior to classification by passing the material through a tunnel 10 housing a conventional cobalt 60 radiation source. Choong Shin-Piaw (*Nature* 154, 516 (1944)) demonstrated that relatively small doses of irradiation activate lattice imperfections which will noticeably alter the rate of solubility in quartz and that even the simultaneous presence of ultraviolet light, which cannot cause any permanent lattice defects, enhances the attack of the acid. G. C. Laemmlein (*Compt. Rend Acad. Sci.*, USSR. 56, 849 (1947)) investigated the effect of x-rays regarding the etching behavior of quartz as did W. Gorski (*Glastechnische Berichte*, 215, April 1961). Both Laemmlein and Gorski imply that the observed increase in solubility may in fact be related to the activated impurity centers. Accordingly, irradiation may be used in the process of the present invention both to speed the leach and to enhance the differentiation of the leach as between quartz with high levels of lattice impurities and purer grade quartz.

The particulate quartz, preferably about −40 mesh, with or without preliminary irradiation, is classified into a plurality of different size fractions 14-19 using conventional classifying apparatus 12. The material may be classified wet but, more typically, is first dried and then classified, e.g. using screens or an air classifier. The drawing FIGURE shows six (6) different size fractions 14-19. In general, the larger the number of size fractions the more efficient the process in terms of removal of impurities with minimal dissolution of quartz. As previously noted, the closer the fraction, i.e. the lower the differences in particle size within the fraction, the less surface area accounts for different rates of dissolution for various particles.

Fractions 14-19 are individually and simultaneously subjected to a first leach in closed tanks 20-25, preferrably using hydrofluoric acid, typically 10 to 50% as the solvent. Optionally, all of fractions 14-19 may be individually leached in a lesser number of vessels, even sequentially using a single vessel. Other solvents useful in the first (and second) leach steps include:

sodium hydroxide
sodium carbonate
ammonium hydrogen fluoride
hydrofluorsilic acid It has been demonstrated by previous workers that the presence of lattice impurities in the quartz affects the rate of solubility. Accordingly, the first leach is preferrably carried to an extent that a significant size differential develops between the quartz particles themselves attributable to a greater or lesser content of lattice impurities. As previously noted, such a significant difference in lattice impurities can exist even between portions of the same crystal.

Various chemical additives may be added to first leach, i.e. leaches 20-25, to minimize loss of quartz.

It has been known for some time that the emerging dissolution body of quartz and the etch FIGURES (hillocks or pits) can be affected by the solvent. This holds especially true for the leaching of quartz using HF mixed with certain organic additives which do not actively participate in the dissolution itself.

Representing this group of chemical additives are:
Alcohols
Ethers
Ketones
Carboxylic Acid
N-Substituted Heterocycles
Alkylated Acid Amides
N-Substituted Acid Amines Preferred are only such additives that produce the least amount of hillocks and pits as these defects contribute toward the formation of bubbles in subsequent melting of the powders. These additives may be used in amounts ranging from 5 wt % to 30 wt % based on the solvent reagent. In previous studies quartz single crystal spheres were etched at various temperatures and in different acid concentrations and using different additives. The etched bodies formed from the spheres were measured optically and the rate of solubility in the directions of the crystallographic axes of the quartz were evaluated. Proceeding from these values, a vector of solubility was introduced into the literature. This vector was found to be normal to a hypothetical plane of solubility and it was found to move with a temperature dependent velocity from the outer parts of the dissolving body to the inner parts. When leaching below room temperature the dissolution of quartz along the a—ā axis is approximately 50 times smaller than along the c—axis. The difference is even larger for solution of $NH_4HF_2$. With increasing leach temperature this difference becomes smaller, but still remains at least 25% at temperatures that can be achieved in an open, not pressurized, leach system. Thus, by use of certain additives the preference for dissolution along the a—ā axis is enhanced and losses of quartz in the first leach are minimized. My preferred additive is an aromatic sulfonic acid, particularly m-benzene disulfonic acid.

Thus, the first leach separates the quartz of desired purity in each batch from the faster dissolving particles and in doing so also cleans the surfaces of that particulate quartz to a degree where all transitory external impurities are no longer of significance. This first leach also eliminates a certain amount of quartz that had considerably higher lattice impurities than the remainder of the batch, as well as the more soluble admixed minerals.

Prior to the first leach the temperature of the material is kept below the melting point of the impurities, e.g., silicates, to avoid melting the mixed-in impurities in view of their potential ability to "alloy" with the quartz or to react with the lattice of the quartz by way of inward diffusion and/or ion exchange. In particular, the element sodium appears as a constituent or impurity in many minerals, liquids and atmospheres. It is generally not a lattice impurity of quartz but, because of its ability to react and its mobility at elevated temperatures, it may easily be incorporated into the lattice of quartz. Katz, *Philips Research Report*, vol. 17, no. 3, June 1962, has shown that heating of hydrogen-containing quartz in sodium-containing atmospheres (or sodium contained on the quartz surface, e.g., as residual feldspar, for that matter) results in the exchange of ions, whereby hydroxyl (OH) becomes replaced with sodium.

The extent of both the first and second leaches is controlled to achieve the desired effect with minimal loss of quartz having the desired degree of purity. This is accomplished by proper selection of reagent, reagent strength, temperature, pressure, additive, leach time and reagent to quartz ratio. The possible combinations of the foregoing variables capable of yielding the desired result are literally infinite in number. However, in the first leach using hydrofluoric acid, the strength of the acid will typically be 10% to 70%. Again, the preferred choice of additive is an aromatic sulfonic acid and, most preferably, m-benzene disulfonic acid. The time for the first leach will typically vary from 5 to 45 minutes, depending largely on choice of amount and strength of the acid.

After the first leach, each of fractions 14-19 is individually wet screened on one of screens 27-32 to remove to waste those particles of a size significantly reduced by leaching. The particles of reduced size will typically include feldspar, iron silicates, and low grade (high lattice impurity) quartz. A screen of a mesh size corresponding to that upon which the fraction to be screened was originally retaieed in classifier 12 is usually suitable for screens 27–32. For example, a leached fraction which was originally −50+60 mesh may be screened at 27 with a 60 mesh screen, thereby removing the particulate material of significantly reduced size as well as totally dissolved impurities.

After the first leach, impurities whose nature is either of the occluded or the interstitial type remain in the recovered product. In a preferred embodiment, the surviving particulate quartz, having undesirable occluded solids, liquids and gases, is attacked. Occluded solids in quartz are quite common and the variety of different types is too great to be listed here. Rutile is by far the most typical and wide-spread occurring of all occluded solids found in quartz. Liquids and gases are also common as occlusions in quartz and include such species as water (crystal water) and liquid gases such as carbon dioxide and hydrocarbons. Some of the liquid gases are occluded as microscopic bubbles and are surrounded by quartz of sufficient strength to sustain their pressure while others are contained at atmospheric pressures and interstitially. The presence of such occluded impurities is of significant concern for all particulate $SiO_2$, whether it be natural or man-made, intended for consumption in semi-conductor type applications in which their liberation into silicon single crystals would have a detrimental effect. This concern particularly applies to the types of liquid and gaseous impurities which have a tendency to survive even the transformation from the crystalline into the amorphous phase of $SiO_2$ in the conventional melting techniques and which are only released slowly into the surrounding atmosphere..

To attack occluded and interstitial impurities, i.e. solid, liquid and gaseous inclusions, each of the fractions 14–19 is first dried at 34–39 and then passed through one of the individual heaters 41–46 to heat same to temperatures exceeding that of the alpha-beta conversion temperature, generally defined as being 573° C. plus or minus 3° C. on heating or cooling, but not to exceed a maximum temperature of 1720° C. Each batch or fraction 14–19 is next passed through one of coolers 48–53 where the hot particulate quartz of each batch is subjected to very rapid radical cooling or quenching in a non-contaminating liquid or gaseous atmosphere having a temperature at least 200° C. lower than the maximum temperature reached in the heating process. This heat-quench cycle serves to fracture the individual particles, the fractures tending to occur at the sites of occluded and interstitial impurities, thereby exposing those impurities to the reagent used in the second leach.

A second leach of each individual batch or fraction 14–19 is conducted in vessels 55–60 to remove the occluded and interstitial impurities exposed by fracturing in the heat/quench cycle as well as those admixed minerals less soluble in the reagent than quartz. The reagents, additives and operating parameters used in the second leach are, in general, the same as those used in the first leach with the exeption of temperature and pressure.

After removal of the critical surface impurities, the application of heat to the particulate quartz is no longer a problem. Both the first and second leaches are conducted in closed vessels and preferably at least one leach is conducted at elevated temperatures and pressures. For this purpose leach vessels 20–25 and 55–60 are closed, pressurized vessels heated, from an external source and by the exothermic heat of reaction. The elevated temperature speeds the process and increases the discrimination of the leach between the quartz product and the material to be separated therefrom. The temperature and pressure will be limited by the resistance of the leach vessel to the reagent employed and by the pressure rating of the vessel.

Again, instead of a series of heating vessels 41–46, quenching vessels 48–53 and leaching vessels 55–60, a lesser number of vessels may be used for each process step with the batches passed in sequence through those vessels.

After the second leach each individual fraction or batch 14–19 is screened a final time to separate the quartz, which is recovered as a product passing through the screen, from the less soluble admixed impurities. In general, each fraction or batch is wet screened in one of classifiers 62–67 on a screen that has the same mesh opening size as that employed in the previous screening. For example, batch 14 screened using a standard 60 mesh screen in 30 to provide a 60+ mesh material (intermediate product) would now be screened using again a 60 mesh screen in 54 to provide a 60− mesh product.

The individual wet screened batches 14–19 may now be dried in 69–74 and appropriately blended to specification at 75 and the combined batch is subjected to degassing in furnace 77. Treatment in furnace 77 is intended to remove those occluded liquids and gases that were not exposed and removed by leaching in the heat/quench and second leach steps. The present inventor has discovered that the combined gas and liquid content of even the most transparent type quartz (as contrasted with translucent or "milky" quartz) may be as high as several percent in weight even after first removing surface water by prolonged heating at 110° C. One possibility for removing the remaining gases and liquids would be to crush the particulate quartz to a fine, flour-like consistency. However, such a technique would yield only an undesirably fine product with a greatly increased surface area generally unsuitable for fused quartz applications and also which would tend to absorb moisture upon exposure to normal atmospheres at room temperature. Therefore, a different approach to degassing must be adopted. The present invention removes such residual, occluded gases and liquids by heating in a controlled atmosphere. The present inventor has discovered that conventional state of the art procedures for removal of organic surface impurities from particulate quartz, involving heating to temperatures of 1100° C. in air for approximately one hour ("calcination") results in an increase of the gaseous constituents of air in the quartz by more than three orders of magnitude, i.e. from $10^{-5}$ cc of gas per gram in the quartz to nearly $10^{-2}$ cc/gm. The present inventor has also discovered that the absorption of gases by quartz during heating can be prevented or reversed if the quartz is heated to a temperature approaching the crystobalite-amorphous $SiO_2$ conversion temperature, generally stated to be at 1728° C., in a partial vacuum. Accordingly, in the preferred embodiment of the present invention, the combined quartz fractions (or individual fractions) are passed through a furnace 77, operated, for example, at 1650°–1720° C. and 10–100 mmHg vacuum. For degassing, the particulate quartz is preferrably spread to a mono-layer thickness (a layer the thickness of the average particle diameter). By spreading the particulate quartz to approximately a two layer thickness, the rate of degassing or outgassing drops by a factor of three as compared to the mono-layer process under otherwise identical conditions. Further experimentation has revealed that a thicker layer (30 mm) of the same material requires hours of exposure to reach a steady state of gaseous content and even then the amount of gases and liquids thereby liberated will generally amount to less than 5 percent of the amount liberated using a mono-layer. The preferred apparatus 77 for carrying out the outgassing procedure is that described in one of U.S. Pat. Nos. 3,895,174, 4,212,661, 4,188,201 and 4,040,795 issued to the present inventor.

The degassed product is finally packaged at 79 into heremetically sealed containers to protect against airborne contamination including moisture pickup.

The following examples serves to illustrate the operating principles of the present invention.

EXAMPLES

Example 1

In order to demonstrate the faster dissolution of particulate quartz containing higher amounts of lattice impurities compared to uartz with lower impurity levels, two lumps were cleaved from larger homogeneous chunks whose lattice impurities (in ppm by weight) were as follows:

|  | Lump 1 | Lump 2 |
| --- | --- | --- |
| Weight - grams | 10.12 | 10.23 |
| Al | 42 | 207 |
| Li | 2 | 50 |
| Na | 1 | 13 |
| K | 0 | 2 |
| Ca | 3 | 1.5 |
| Ti | .8 | .6 |

Next, both lumps were placed in a teflon beaker and covered with 20% HF. The beaker was placed on a hot plate with the temperature maintained at 140° F. Additional acid was added to the beaker whenever needed to make up for the evaporation losses.

From time to time, both lumps were removed, washed in deionized water, dried at 110° C., and weighed.

The lump with the higher lattice impurities dissolved much more quickly than the purer one which actually survived for more than 24 hours.

| | Weight in Grams | |
| --- | --- | --- |
| Time (hours) | Lump 1 | Lump 2 |
| 1 | 9.99 | 8.07 |
| 2 | 9.76 | 6.53 |
| 4 | 9.27 | 3.93 |
| 24 | 8.74 | .52 |

Example 2

Finely divided quartz containing admixed iron silicates was screened into five different fractions having mesh sizes of (−50+60), (−60+70), (−70+80), (−80+100) and (−100+140).

Forty (40) grams of each fraction were placed in separate teflon beakers and covered with 80 ml of 49% hydrofluoric acid (49%HF). The beakers were placed on a hot plate kept between 115° and 125° F. for one hour. Thereafter the leached samples were washed, dried and weighed. Next, each sample was screened through the lower of its non-contaminating screens, e.g., nylon, to avoid Fe pickup, and the newly created fractions were analyzed for iron.

| | Iron Content in ppm by Weight | | |
| --- | --- | --- | --- |
| Original Fraction | Fractions after the Leach | Iron Content in ppm by Weight | Weight Dissolved (96) |
| −50 + 60 | +60 | 1.6 | 14.3 |
| | −60 | 17.0 | |
| −60 + 70 | +70 | .58 | 15.4 |
| | −70 | 3.74 | |
| −70 + 80 | +80 | 0 | 15.9 |
| | −80 | 2.0 | |
| −80 + 100 | +100 | .53 | 25.1 |
| | −100 | 7.13 | |
| −100 + 140 | +140 | .53 | 24.9 |
| | −140 MESH | 15.0 | |
| MESH | | | |

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

I claim:

1. A process for recovering a particulate silica product from a particulate raw material silicon dioxide of a purity lower than that of said product, said process comprising:
    (a) classifying said particulate silicon dioxide to obtain a plurality of sized fractions;
    (b) treating one of said sized fractions with a reagent which is a solvent for the silicon doxide to create a size differential between an undesirable portion of said one fraction and a desirable portion of said one fraction, said desirable, portion having a higher silica purity than said undesirable portion; and
    (c) classifying the treated fraction by size to isolate the desirable portion as said silicon dioxide product.

2. A process in accordance with claim 1 wherein the classifying in steps (a) and (c) is by use of screens and wherein a fraction on one screen in step (a) is leached in step (b) and then screened in step (c) using a screen of the same mesh size as said one screen, and comprising recovering the material retained on the screen in step (c) as said silicon dioxide product.

3. A process in accordance with claim 1 wherein said classifying is by use of screens and wherein said one sized fraction is a fraction passed through one screen and collected on another screen.

4. The process of claim 1 wherein said classifying in step c is by use of at least two screens of different mesh sizes to obtain at least three fractions of differing particle size distribution wherein said silicon dioxide product is retained on the finer mesh screen.

5. The process of claim 1 wherein said silicon dioxide is naturally occurring quartz.

6. The process of claim 1 wherein said reagent comprises hydrofluoric acid.

7. The process of claim 6 wherein said reagent further comprises an inorganic mineral acid other than hydrofluoric acid.

8. The process of claim 1 wherein said reagent is selected from the group consisting of ammonium hydrogen fluoride, hydrofluorsilic acid, hydrofluoric acid, sodium hydroxide and sodium carbonate.

9. The process of claim 1 wherein the classification of step c is by means of a screen with the material retained on said screen being recovered as said silicon dioxide product.

10. A process in accordance with claim 9
wherein said particulate raw material contains material less soluble in said reagent than said silicon dioxide produce;
wherein the classification of step b is by means of at least two screens of different mesh opening size; and
wherein said less soluble material is retained on one screen and said silicon dioxide produce is retained on another screen.

11. A process in accordance with claim 1 further comprising subjecting another of said sized fractions to steps b and c to obtain additional silicon dioxide produce.

12. A process in accordance with claim 1 wherein said raw material includes admixed minerals other than silicon dioxide and silicon dioxide particles having a higher level of lattice impurities than said silicon dioxide produce.

13. A process in accordance with claim 1 wherein an additive is added to said reagent in step a to minimize the formation of etch patterns of hillocks and pits, said additive being selected from the group consisting of alcohols, ethers, ketones, carboxylic aicds, N-substituted heterocycles, alkylated acid amides and N-substituted acid amides.

14. A proces for recovering a quartz product from a particulate quartz containing admixed and adhering impurities, said product being of a higher purity than said particulate quartz, said process comprising:
(a) classifying a particulate quartz to obtain a plurality of sized fractions;
(b) treating one of said sized fractions with a reagent which is a solvent for the quartz to reduce the size of those quartz particles containing amounts of lattice impurities higher than the fraction average and to reduce in size those admixed minerals more soluble than quartz;
(c) classifying the treated fraction by size to separate, as the larger size particles, an intermediate quartz product from said lattice impurity containing quartz particles and more soluble minerals;
(d) treating said intermediate product fraction with a reagent which is a solvent for the quartz to dissolve significantly more quartz than dissolved in step b, thereby reaching the size of the intermediate quartz product relative to less soluble minerals admixed therewith; and
(e) classifying the product of step d to separate the larger sized less soluble mineral particles from the smaller sized quartz particles and recovering the smaller sized quartz particles as said higher purity product.

15. A process in accordance with claim 14 wherein the reagents used in steps b and d are selected from the group consisting of hydrofluoric acid, ammonium hydrogen fluoride, sodium hydroxide, sodium carbonate and hydrofluorsilic acid.

16. A process in accordance with claim 14 wherein the reagent used in at least one of steps b and d is an admixture of hydrofluoric acid and a minor amount of m-benzene disulfonic acid.

17. A process in accordance with claim 16 wherein said reagent further comprises an inorganic mineral acid other than hydrofluoric acid.

18. A process in accordance with claim 14 wherein the classification in step a produces at least 5 different sized fractions, each of which is individually subjected to steps b-c.

19. A process in accordance with claim 14 wherein the classification in steps b and d is performed by screening with said intermediate product being retained on the screen in step c and the quartz passing through the screen used in step d.

20. A process in accordance with claim 14 wherein step d dissolves at least 150 percent the amount of quartz dissolved in step b.

21. A process in accordance with claim 14 wherein said particulate quartz is irradiated prior to step b.

22. A process in accorance with claim 14 wherein a portion of admixed minerals are separated from the quartz by flotation prior to step a.

23. A process in accordance with claim 14 wherein said intermediate product is heated to a temperature of at least 1650° C. and then introduced at said temperature into an environment at least 200° C. less than said temperature to fracture said intermediate product thereby exposing occluded and interstitial impurities.

24. A process in accordance with claim 14 further comprising, after step d, heating said one fraction before or after combination with other fractions treated in steps b-d to a temperature in the range of 1650° C.-1720° C. in a vacuum to reduce the content of adsorbed gas in said particulate quartz.

25. A process for recovering a quartz product from a particulate raw material containing quartz, said quartz in said raw material containing lattice impurities and being in admixture with ohter minerals, said process comprising:
(a) irradiating said admixture to activate the lattcie impurities in the quartz;
(b) classifying said admixture to obtain different sized fractions;
(c) treating each of said different sized fractions individually with a reagent which is a solvent for the quartz to reduce the size of particles of minerals more soluble than quartz relative to the quartz and to reduce the size of those quartz particles having a higher than median content of lattice impurities relative to the size of the remaining quarta particles;
(d) screen each of the fractiosn treated in step b to separate the particles of reduced size from an intermediate quartz product which retained on the screen;
(e) heating each fraction individually and introducing the heated fraction into a relatively cool medium for quenching to fracture the quartz particles thereby exposing occluded and interstitial impurities;
(f) treating each of said sized fractions individually with a reactent which is a solvent for the quartz to dissolve significantly more quartz than dissolved in step (c), to dissolve the occluded and interstitial impurities exposed in step e and to reduce the quartz in size relative to admixed, less soluble minerals;

(g) screening each fraction treated in step f to separate said admixed, less soluble minerals and to recover quartz as the material passing through the screen; and (h) heating each of the quartz fractions recovered in step g to at least 1650° C. in a vacuum to reduce the quantity of gases absorbed therein thereby providing said higher purity quartz product.

26. A process in accordance with claim 25 wherein said reagent used in at least one of said treating steps comprises hydrofluoric acid and an aromatic sulfonic acid.

27. A process in accordance with claim 24 wherein said aromatic sulfonic acid is m-benzene disulfonio acid.

* * * * *